United States Patent
Zhou et al.

(10) Patent No.: US 12,137,445 B2
(45) Date of Patent: Nov. 5, 2024

(54) RESOURCE ALLOCATION METHOD, ELECTRONIC DEVICE AND COMPUTER READABLE STORAGE MEDIUM

(71) Applicant: SHENZHEN UCLOUDLINK NEW TECHNOLOGY CO., LTD., Guangdong (CN)

(72) Inventors: Jian Zhou, Guangdong (CN); Zhihui Gong, Guangdong (CN)

(73) Assignee: SHENZHEN UCLOUDLINK NEW TECHNOLOGY CO., LTD., Guangdong (CN)

( * ) Notice: Subject to any disclaimer, the term of this patent is extended or adjusted under 35 U.S.C. 154(b) by 327 days.

(21) Appl. No.: 17/685,744

(22) Filed: Mar. 3, 2022

(65) Prior Publication Data
US 2022/0191868 A1 Jun. 16, 2022

Related U.S. Application Data

(63) Continuation-in-part of application No. PCT/CN2020/115579, filed on Sep. 16, 2020.

(30) Foreign Application Priority Data

Sep. 30, 2019 (CN) .......................... 201910941771.3

(51) Int. Cl.
*H04W 4/00* (2018.01)
*H04B 17/318* (2015.01)
(Continued)

(52) U.S. Cl.
CPC ...... *H04W 72/0453* (2013.01); *H04B 17/318* (2015.01); *H04W 72/542* (2023.01); *H04W 84/18* (2013.01)

(58) Field of Classification Search
CPC ........... H04W 72/0453; H04W 72/542; H04W 84/18; H04W 12/084; H04W 12/72;
(Continued)

(56) References Cited

U.S. PATENT DOCUMENTS

| 10,959,086 B2 | 3/2021 | Chen et al. |
| 2014/0051422 A1 | 2/2014 | Mittal et al. |

(Continued)

FOREIGN PATENT DOCUMENTS

| CN | 101222711 A | 7/2008 | |
| CN | 104486818 A * | 4/2015 | ............ H04W 48/18 |

(Continued)

OTHER PUBLICATIONS

International Search Report for International Application No. PCT/CN2020/115579; Date of Completion: Nov. 4, 2020; Date of Mailing: Dec. 2, 2020.
(Continued)

*Primary Examiner* — Phuongchau Ba Nguyen
(74) *Attorney, Agent, or Firm* — CANTOR COLBURN LLP (57) ABSTRACT

The present disclosure is applicable to the technical field of mobile communications, and a resource allocation method is provided, this method includes: receiving a SIM card activate request, the SIM card activate request includes identification information of the SIM card; obtaining information of a corresponding carrier of the SIM card according to the identification information; selecting a cloud modem that matches with the information of the carrier from a set of cloud modems as a target cloud modem; sending an indication message for enabling the SIM card to the target cloud modem, the indication message for enabling the SIM card includes the identification information and is used to instruct the target cloud modem to access a mobile communication network of the corresponding carrier of the SIM card according to the identification information.

19 Claims, 6 Drawing Sheets

(51) Int. Cl.
*H04W 72/0453* (2023.01)
*H04W 72/542* (2023.01)
*H04W 84/18* (2009.01)

(58) Field of Classification Search
CPC ......... H04W 8/205; H04W 8/18; H04W 8/20;
H04W 8/26; H04W 28/04; H04W 72/04;
H04W 72/042; H04W 88/08; H04W
28/08; H04W 28/084; H04W 36/22;
H04W 72/12; H04B 17/318; H04L
5/0007
See application file for complete search history.

(56) References Cited

U.S. PATENT DOCUMENTS

| | | |
|---|---|---|
| 2016/0037329 A1 | 2/2016 | Chong et al. |
| 2017/0280313 A1* | 9/2017 | Zhu ............... H04W 8/183 |
| 2017/0347263 A1 | 11/2017 | Dutta et al. |
| 2018/0041893 A1* | 2/2018 | Guo ............... H04W 12/06 |
| 2020/0128393 A1* | 4/2020 | Wane ............... H04W 88/06 |
| 2020/0236531 A1* | 7/2020 | Chen ............... H04W 88/02 |
| 2020/0322782 A1* | 10/2020 | Gong ............... H04W 88/18 |

FOREIGN PATENT DOCUMENTS

| | | | | |
|---|---|---|---|---|
| CN | 106028315 | A | 10/2016 | |
| CN | 106878987 | A * | 6/2017 | ............ H04W 88/06 |
| CN | 107370515 | A | 11/2017 | |
| CN | 108616869 | A | 10/2018 | |
| CN | 109413145 | A * | 3/2019 | ............ H04W 76/10 |
| WO | 2018236942 | A1 | 12/2018 | |

OTHER PUBLICATIONS

Translation of International Search Report for International Application No. PCT/CN2020/115579; Date of Completion: Nov. 4, 2020; Date of Mailing: Dec. 2, 2020.

Written Opinion for International Application No. PCT/CN2020/115579; Date of Completion: Nov. 4, 2020; Date of Mailing: Dec. 2, 2020.

* cited by examiner

RESOURCE ALLOCATION METHOD, ELECTRONIC DEVICE AND COMPUTER READABLE STORAGE MEDIUM

CROSS-REFERENCE TO RELATED APPLICATIONS

This application is a continuation-in-part of PCT patent application Serial No. PCT/CN2020/115579, with an international filing date of Sep. 16, 2020, which claims priority to Chinese patent application No. 201910941771.3 filed on Sep. 30, 2019 and entitled "resource allocation method, resource allocation device, electronic device and storage medium", the contents each of which are incorporated herein by reference in entirety.

TECHNICAL FIELD

The present disclosure relates to the technical field of mobile communication, and more particularly to a resource allocation method, a resource allocation device, an electronic device and a non-transitory computer readable storage medium.

BACKGROUND

When a user needs to go to a country or a cross-regional travel, since the international roaming and domestic cross-zone roaming charge is expensive, the Subscriber Identification Module (SIM) is generally used, but still has the need to communicate through the original SIM card of this country, so as to avoid missing important telephones or information.

SUMMARY

The embodiments of the present disclosure provide a resource allocation method, a resource allocation device, an electronic device and a storage medium, which can solve the problem discussed above.

In aspect one, a resource allocation method is provided in one embodiment of the present disclosure, the method includes:
  receiving a SIM card activate request by a cloud server, where the SIM card activate request includes identification information of the SIM card;
  obtaining information of a corresponding carrier of the SIM card according to the identification information by the cloud server;
  selecting, from a set of cloud modems, a cloud modem that matches with the information of the carrier as a target cloud modem by the cloud server; and
  sending an indication message for enabling the SIM card to the target cloud modem by the cloud server, where the indication message for enabling the SIM card includes the identification information; where the indication message for enabling the SIM card is used to instruct the target cloud modem to access a mobile communication network of the corresponding carrier of the SIM card according to the identification information of the SIM card.

In aspect two, an electronic device is provided in one embodiment of the present disclosure, the electronic device includes a memory, a processor, and a computer program stored in the memory and executable by the processor, when the computer program is executed by the processor, the processor is configured to perform a resource allocation method including: receiving a SIM card activate request by a cloud server, wherein the SIM card activate request comprises identification information of the SIM card; obtaining information of a corresponding carrier of the SIM card according to the identification information by the cloud server; and selecting, from a set of cloud modems, a cloud modem that matches with the information of the carrier as a target cloud modem by the cloud server; and sending an indication message for enabling the SIM card to the target cloud modem by the cloud server, where the indication message for enabling the SIM card includes the identification information; where the indication message for enabling the SIM card is used to instruct the target cloud modem to access a mobile communication network of the corresponding carrier of the SIM card according to the identification information.

In aspect three, one embodiment of the present disclosure provides a non-transitory computer readable storage medium which stores a computer program, that, when executed by a processor, causes the processor to implement the steps in the resource allocation method including: receiving a SIM card activate request by a cloud server, where the SIM card activate request includes identification information of the SIM card; obtaining information of a corresponding carrier of the SIM card according to the identification information by the cloud server; and selecting, from a set of cloud modems, a cloud modem that matches with the information of the carrier as a target cloud modem by the cloud server; and sending an indication message for enabling the SIM card to the target cloud modem by the cloud server, where the indication message for enabling the SIM card includes the identification information; where the indication message for enabling the SIM card is used to instruct the target cloud modem to access a mobile communication network of the corresponding carrier of the SIM card according to the identification information.

In aspect four, one embodiment of the present disclosure provides a computer program product, when the computer program product is executed on the electronic device, the electronic device is caused to perform the steps of the resource allocation method in the aspect one.

It can be understood that, the advantageous effects of the aspect two, the aspect three, the aspect four can be referred to the relevant descriptions in the aspect one, thus, these advantageous effects are not repeatedly described herein.

BRIEF DESCRIPTION OF THE DRAWINGS

In order to describe the technical solutions in the embodiments of the present disclosure more clearly, a brief introduction regarding the accompanying drawings that need to be used in the embodiments or the related art is given below; it is obvious that the accompanying figures described below are merely some embodiments of the present disclosure, for the person of ordinary skill in the art, other drawings can also be obtained according to the current drawings without paying creative labor.

DESCRIPTION OF THE PREFERRED EMBODIMENTS

In the following descriptions, in order to describe but not intended to limit the present disclosure, concrete details such as specific system structure, technique, and the like are proposed, so that a comprehensive understanding of the embodiments of the present disclosure is facilitated. However, it will be apparent to the ordinarily skilled one in the art that, the present disclosure can also be implemented in some other embodiments which do not include these concrete details. In some other conditions, detailed explanations of method, circuit, device and system well known to the public are omitted, so that unnecessary details may be prevented from obstructing the description of the present disclosure.

It should be understood that, when a term "comprise/include" is used in the description and annexed claims, the term "comprise/include" indicates existence of the described characteristics, integer, steps, operations, elements and/or components, but not exclude existence or adding of one or more other characteristics, integer, steps, operations, elements, components and/or combination thereof.

It should be further understood that, terms "and/or" used in the description and the annexed claims of the present disclosure are referred to as any combination of one or a plurality of listed item(s) associated with each other and all possible items, and including these combinations.

As is used in the description and the annexed claims, a term "if" may be interpreted as "when" or "once" or "in response to determination" or "in response to detection". Similarly, terms such as "if it is determined that", or "if it is detected that (a described condition or event)" may be interpreted as "once it is determined" or "in response to the determination" or "once it is detected that (the described condition or event)" or "in response to the detection (the described condition or event)".

Additionally, in the descriptions of the specification and the annexed claims, terms such as "first" and "second", "third", etc., are only intended to be discriminated in description, and shouldn't be interpreted as indicating or implying a relative importance.

The descriptions of "referring to one embodiment" and "referring to some embodiments", and the like as described in the specification of the present disclosure means that a specific feature, structure, or characters which are described with reference to this embodiment are included in one or more embodiments of the present disclosure. Thus, the sentences of "in one embodiment", "in some embodiments", "in some other embodiments", "in other embodiments", and the like in this specification are not necessarily referring to the same embodiment, but instead indicate "one or more embodiments instead of all embodiments", unless there is a special emphasis in other manner otherwise. The terms "comprising", "including", "having" and their variations mean "including but is not limited to", unless there is a special emphasis in other manner otherwise.

When a user needs to go abroad or have a cross-regional travel, since international roaming fee and domestic cross-region roaming fee are expensive, a SIM (Subscriber Identification Module) card located at a travel place is generally used, however, there still exists a need to communicate through the original SIM card in the home country to be avoided from missing important telephones or information. Embodiments of the present disclosure provide a communication system that bonds the original SIM card with a cloud modem (i.e., cloud modem), and performs voice and short message communication through the cloud modem.

Figure 1:
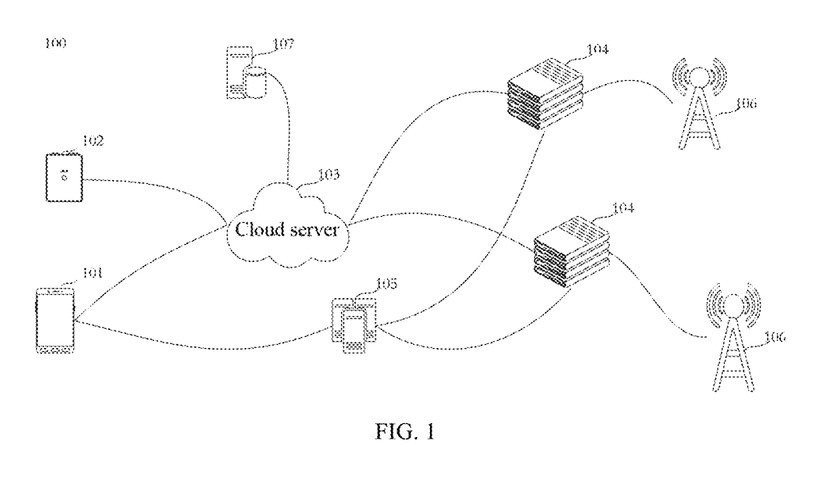
FIG. 1 illustrates a schematic diagram of a communication system based on cloud modem according to one embodiment of the present disclosure.

FIG. 1 shows a communication system 100 based on the cloud modem according to one embodiment of the present disclosure, the communication system 100 includes a UE (User Equipment) 101, a card reading device 102, a cloud server 103, a cloud modem 104, a VOIP (Voice over Internet Protocol) server 105, and a mobile communication network access device 106.

In the communication system 100, the user reads the SIM card information through the card reading device 102, and sends the SIM card information to the cloud server 103 through a wired or wireless communication network. The user equipment 101 sends the SIM card information to the cloud modem 104 connected with the cloud server 103 through a wired or wireless network. After the cloud modem 104 accesses the mobile communication network through the mobile communication network access device 107, the cloud modem 104 provides the user equipment 101 with a communication service through the VOIP server 105 to enable the user equipment 101 to make a phone call, and receive and transmit information through the cloud modem 104. In this process, if there are a plurality of cloud modems 104 connected to the cloud server 103, the cloud server 103 needs to select a cloud modem 104 that meets user requirement to provide communication services for the user.

In the process of configuring the SIM card to the cloud modem 104 to provide the communication service, the problem that the signal quality of the cloud modem 104 is poor due to poor signal quality of the location of the cloud modem 104 or due to interference, network congestion or the like may occur. Moreover, different SIM cards are classified into different regions and different carriers, roaming charges may be incurred or may not be incurred, or the prices of roaming charges are also different, how to select a cloud modem 104 suitable for the SIM card becomes a problem that needs to be solved.

In order to solve the problems mentioned above, in some embodiments, the cloud server obtains feature information of the cloud modem; the cloud server determines a set of cloud modems according to the feature information of the cloud modem, where the feature information is used to represent feature information including but not limited to a network type, a location, a signal quality of the cloud modem. The set of cloud modems is determined according to the feature information, for example, the cloud modems are sorted, combined and screened according to the feature information so as to determine the set of cloud modems. The cloud server selects a cloud modem in the set of cloud modems as the target cloud modem, and sends the SIM card identification information to the target cloud modem, the target cloud modem initiates an access and an authentication process for the SIM card to enable the SIM card and provide a communication service for the user equipment using the SIM card. According to the steps, an accessible cloud modem in the plurality of cloud modems can be allocated to the SIM card, and automatic matching between the SIM card and the cloud modem is realized, so that an allocation efficiency of cloud modems is improved, and resources of cloud modems are fully utilized. Furthermore, a cloud modem which is suitable to be used by the SIM card and meets the conditions including but are not limited to, the best signal quality, the lowest roaming fee, the optimal carrier service may be allocated to the SIM card.

In some embodiments, the cloud server obtains network feature information of the cloud modem, the network feature information includes but is not limited to a mobile communication network standard and frequency band information supported by hardware devices of the cloud modem and accessible mobile communication network information of the location of the cloud modem. The mobile communication network standard and the frequency band information supported by the hardware devices of the cloud modem include but are not limited to a mobile communication network supported by the hardware devices of the cloud modem, the frequency band information that may be supported by the cloud modem in the network standard, and the number of SIM cards of the various types of mobile communication network supported by the cloud modem. Where the mobile communication network information which can be accessed locally by the cloud modem includes the information of the mobile communication network which is accessible by the cloud modem by searching for network signals of the location of the cloud modem. By determining the network feature information of the cloud modem and the information of the carrier which allocates the SIM card, and the SIM card is avoided from being allocated to a network which is not supported by the cloud modem, for example, a SIM card that supports CDMA network can only be allocated to the cloud SIM card in the event that the cloud modem supports the CDMA network, in this situation, except the determination of whether the cloud modem supports the SIM card, it is also necessary to determine whether the SIM card is allocated to the cloud modem and is enabled, so that the SIM card can be allocated to a carrier that can be accessed by the SIM card according to the method described above.

In some embodiments, the cloud server obtains the location feature information of the cloud modem, determines the location of the cloud modem, generates and maintains a set of cloud modems, for example, a cloud modem queue. When the user requests the cloud server to allocate a cloud modem to the SIM card through the user equipment, the cloud server matches a location of a cloud modem in the available cloud modem queue with the home location of the SIM card, and preferentially allocates a cloud modem in a roaming region where the carrier of the SIM card is located to the user, thereby saving a roaming charge for the user.

In some embodiments, the cloud server obtains network signal strength information of the cloud modem according to the access request of the cloud modem, or obtains historical call quality information of the cloud modem according to the historical call quality detection record of the cloud modem, or obtains user feedback information about call quality according to user feedback record of historical call quality of the cloud modem. The cloud server allocates a cloud modem with the best signal quality to the SIM card by sorting the service quality feature information. Therefore, the user can be provided with the communication service with the optimal communication quality.

It can be understood that, in practical implementation, a cloud modem can be allocated to a SIM card according to the location feature information and the service quality feature information, a cloud modem which is located at the home location of the SIM card and has the best signal quality can also be allocated to the SIM card according to the location feature information, so that the roaming charge can be avoided, and the optimal communication quality can also be obtained at the same time.

In some embodiments, the cloud server updates the feature information of the cloud modem regularly. The cloud modem feature information includes but is not limited to the working state information of the cloud modem, the location feature information of the cloud modem, the service quality feature information of the cloud modem, and the network feature information of the cloud modem. The cloud server reallocates the target cloud modem to the SIM card according to the updated set of cloud modems. For example, the cloud modem network state information is reported to the cloud server by the cloud modem periodically. The network state information includes but is not limited to the information including location information, signal strength information and network type of the cloud modem. Once the network state information of the cloud modem changes, the cloud modem queue is updated by the cloud server. Therefore, a cloud modem which has the best signal quality or a cloud modem which is located at the home location of the SIM card can be allocated to the SIM card, a problem of unavailable cloud modem is avoided.

In some embodiments, the cloud server updates the cloud modem queue according to the signal strength, if the signal quality of the cloud modem corresponding to the SIM card is weakened, a cloud modem having better signal quality is allocated to the SIM card, and the cloud modem having weakened signal quality is moved into an unavailable cloud modem queue.

In some embodiments, the cloud server updates the cloud modem queue according to the location information.

In some embodiments, if the cloud modem is offline, the cloud modem is reallocated to the SIM card on the cloud modem. When the cloud server does not receive the state information of the cloud modem within a time limit, or does not respond within the time limit after a message is sent to the cloud modem, the cloud modem is determined to be offline.

In some embodiments, after the IP address of the cloud modem is obtained by the cloud server, a location information query server corresponding to the IP address provided by an external server is used to obtain the location information of the cloud modem, in some embodiments, the IP address is a public network IP address.

It may be understood that, in FIG. 1, the VOIP server may be a centralized server that connects with all cloud modems through a wired or wireless network, the VOIP server may also be connected to one or more cloud modems through a wired or wireless network, the VOIP server may also be connected to the cloud modem through a wired or wireless network in the form of a cloud server. A person skilled in the art may deploy the VOIP server according to actual requirement, the illustration shown in the embodiment of the present disclosure and the descriptions corresponding to the illustration do not constitute a limitation to the specific deployment of the VOIP server.

The UE (User Equipment) includes but is not limited to a terminal device such as a mobile phone, a tablet computer, a wearable device, a vehicle-mounted device, an AR (Augmented Reality)/VR (Virtual Reality) device, a notebook computer, an UPMC (Ultra-Mobile Personal Computer), a netbook, a PDA (Personal Digital Assistant), etc., and the specific type of the terminal device is not limited in this embodiment of the present disclosure.

Where, the SIM card includes but is not limited to a chip that stores digital mobile telephone user information, encryption key and user phonebook, an embedded chip or a virtual chip. The SIM card is used to authenticate the identity of a user who uses digital mobile communication network, and is used for user communication encryption. The SIM card includes but is not limited to a SIM (Subscriber Identification Module) card, a UIM (User Identity Model) card, a USIM (Universal Subscriber Identity Module) card, an eSIM card (Embedded Subscriber Identification Module) card, a soft SIM card, a VSIM (Virtual Subscriber Identification Module) card, and the like.

The cloud modem accesses to the Internet in a wired or wireless manner, and provides a communication device having modulation and demodulation functions for the user equipment in the VOIP manner; this communication device includes but is not limited to a baseband processing unit, a DAC (Digital-to-Analog Conversion) unit, a processor, a memory, and a RF (Radio Frequency) unit; the device is deployed at different geographical locations according to actual operation, and provides communication service in the form of a cloud service according to the SIM card information; in some embodiments, the cloud modem is fixedly deployed at a specific location, in some embodiments, the cloud modem is a portable device.

Where, the cloud server is a server, a server cluster, a distributed server or a cloud server that provides a cloud modem allocation service for the SIM card through a wired or wireless communication network.

Where, the user equipment and the card reading device may be the same device, or may be separate devices.

Where, the mobile communication network access device is a mobile communication access device that can be accessed by the cloud modem locally, and can be such as a base station. The mobile communication network includes but is not limited to GSM (Global System of Mobile Communication), GPRS (General Packet Radio Service), CDMA (Code Division Multiple Access), WCDMA (Wideband Code Division Multiple Access), LTE (Long Term Evolution), and 5G (The fifth Generation Mobile Communication Network).

Embodiment 1

Figure 2:
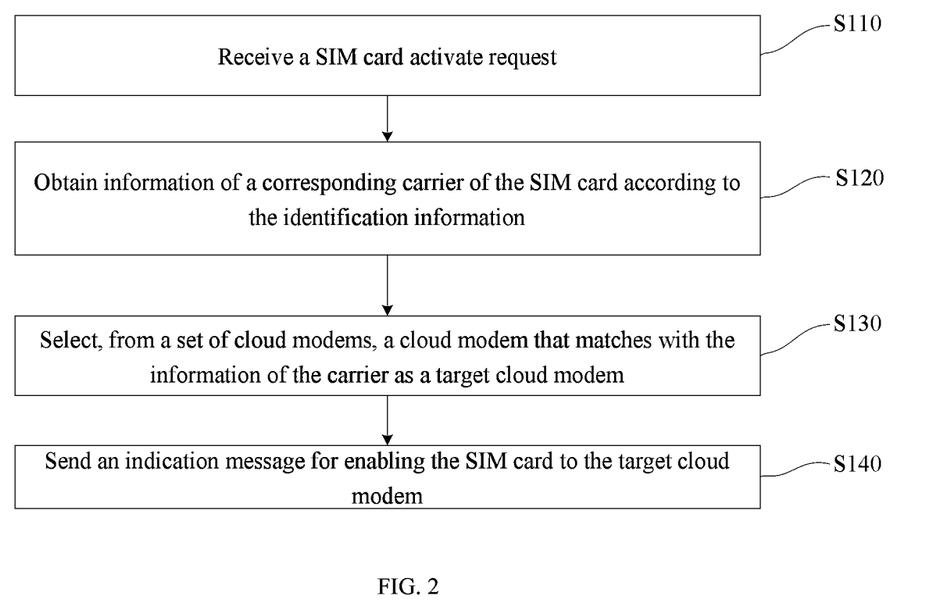
FIG. 2 illustrates a schematic flow diagram of a resource allocation method according to one embodiment of the present disclosure.

FIG. 2 illustrates a resource allocation method according to one embodiment of the present disclosure, this method is applied to a cloud server 103 in the communications system 100 shown in FIG. 1, and may be implemented by software/hardware of the cloud server. As shown in FIG. 2, the method includes the following steps, and the specific implementation principles of the steps S110 to S140 are as follows:

At step S110, a SIM card activate request is received, where the SIM card activate request includes identification information of the SIM card.

In one preferable embodiment, the cloud server receives a subscriber identity recognition card, such as a SIM card, the SIM card activate request includes the identification information of the SIM card, such as IMSI (International Mobile Subscriber Identity) information.

In one preferable embodiment, the SIM card activate request is sent to the cloud server by the card reading device 102 in FIG. 1, the user inserts the SIM card into the card reading device 102, and the card reading device 102 reads the identification information of the SIM card and then sends the SIM card activate request to the cloud server.

In one non-limiting example, the SIM card activate request is sent to the cloud server by the user equipment 101 shown in FIG. 1.

For example, the cloud server receives identification information of a SIM card sent by the SIM card reading device 102, receives SIM card query information sent by the user equipment, and sends available SIM card list information to the user equipment according to the SIM card query information; the SIM card list information is used to instruct the user equipment to determine identification information of the SIM card, and reply the SIM card activate request including the identification information. In one specific example, the user equipment and the SIM card reading device 102 are two separate electronic devices, moreover, the user equipment and the SIM card reading device 102 are in a binding relationship, after the user inserts the SIM card into the SIM card reading device 102, the SIM card reading device 102 sends the information of the SIM card to a cloud server. When the user operates the user equipment to enable the SIM card, the SIM card query information is sent to the cloud server through the user equipment. The cloud server sends all SIM card information to the user equipment to be selected by the user, where the SIM card information is sent to the cloud server by the SIM card reading device 102 bound with the user equipment. When the user selects a SIM as the SIM card to be enabled, the user equipment sends a SIM card activate request to the cloud server, where the SIM card activate request includes identification information (e.g., IMSI information) of the SIM card specified by the user.

For example, when the user equipment and the SIM card reading device 102 are the same device, the cloud server receives the SIM card information (e.g., the IMSI information) sent by the user equipment, and receives the SIM card activate request sent by the user equipment simultaneously, and allocates a cloud modem to the SIM card according to the SIM card activate request.

At step S120, carrier information of a corresponding carrier of the SIM card is obtained according to the identification information.

In one preferable embodiment, a carrier list corresponding to the identification information is generated according to the identification information; the carrier list is sent to the user equipment; a carrier confirmation message sent by the user equipment is received; and the carrier information is determined according to the carrier confirmation message. In particular, the cloud server obtains a MCC (Mobile Country Code) and a MNC (Mobile Network Code) of the SIM card according to the identification information of the SIM card, and generates a selectable carrier list corresponding to the SIM card according to the MCC, the MNC and a pre-stored carrier list or a carrier list obtained by querying through third-party service, sends the selectable carrier list to the user equipment, receives the carrier confirmation message sent by the user equipment, and determines the carrier information according to the carrier confirmation message. In one preferable embodiment, optionally, the selectable carrier list may be a subdivided carrier list. For example, the carrier is determined as China Mobile according to the MCC and the MNC, then, the selectable carrier list generated according to the pre-stored or queried carrier list is all or a part of the list of sub-companies of China Mobile, such as Guangdong Mobile, Shanxi Mobile, Yunnan Mobile, . . . , Sichuan Mobile. It can be understood that the selectable carrier list may be set by a person of ordinary skill in the art under the teachings of the present disclosure, and the selectable carrier list may be set as a specific level according to actual requirement.

At step S130, a cloud modem matched with the carrier information is selected as a target cloud modem from a set of cloud modems.

In one preferable embodiment, the set of cloud modems in the cloud server is pre-sorted and stored in the cloud server, the carrier information of the cloud modem in the cloud server is pre-stored carrier information that can be accessed by the cloud modem, the carrier information corresponding to the SIM card is matched with the carrier information corresponding to the SIM card through the pre-stored carrier information, and a cloud modem that can intercept the carrier of the SIM card can be provided to the SIM card. It may be understood that the method for selecting cloud modems in this example may be randomly designated or in a preset order such as the order of accessing the cloud server requested by the cloud modem, or the order set by a person skilled in the art according to the actual implementation condition.

In one preferable embodiment, the cloud server receives an access request sent by the cloud modem, where the access request includes device identification information of the cloud modem, network information supported by the cloud modem, and the mobile communication network information that can be accessed by the cloud modem. The cloud server adds the cloud modem into a subset of the set of cloud modems classified by network information by determining the network information in the access request of the cloud modem. The set of cloud modems may be stored in a form of table or queue, and the person skilled in the art may make a selection according to actual situation. The cloud server selects a cloud modem that matches with the carrier information corresponding to the SIM card in the set of cloud modems as the target cloud modem. In a specific example, if the corresponding carrier of the SIM card is China Union, a cloud modem that supports China Union communication network and can access China Union communication network locally is selected for the SIM card. Alternatively, a cloud modem that can support China Union communication network and can access China Union network through China Mobile communication network in a roaming manner is selected for the SIM card.

In one preferable embodiment, the cloud modem in the set of cloud modems has states including but is not limited to the following states: an allocable state, an allocating state, and an unallocated state. The cloud server maintains a status flag of each cloud modem registered in the cloud server. When the cloud modem is in an allocable state or an allocating state, the cloud modem is continued to be remained in the set of cloud modems to be allocated, when the cloud modem is in the unallocated state, the cloud modem is moved out of the set of cloud modems. When the allocable state of the cloud modem is a single or concurrent threads/processes of the cloud server, the cloud modem can be allocated to the SIM card for communication; when the allocating state of the cloud modem is one certain thread/process of the cloud server, a process of allocating the cloud modem to a SIM card currently is performed, a contention that other threads/processes is allocating the cloud modem at the same time is avoided; when the cloud modem is in the unallocable state, for example, when the number of SIM cards of the cloud modem reaches a maximum capacity or when the cloud modem malfunctions, the cloud server moves the cloud modem out of the set of cloud modems; when the cloud server detects that the cloud modem is in the allocable state, the cloud modem is added into the set of cloud modems.

At step S140, an indication message for enabling the SIM card is sent to the target cloud modem, where the indication message for enabling the SIM card includes the identification information; and the indication message for enabling the SIM card is used to instruct the target cloud modem to access a mobile communication network of a corresponding carrier of the SIM card according to the identification information.

In one preferable embodiment, the cloud server sends an indication message for enabling the SIM card to the target cloud modem, where the indication message for enabling the SIM card includes but is not limited to IMSI information that is used to enable the SIM card and the information of the SIM card reading device. After receiving the indication message for enabling the SIM card, the target cloud modem initiates a process of accessing a mobile communication network selected by the cloud server for the SIM card according to the IMSI information. The access process includes but is not limited to an access request to the mobile communication network initiated by the cloud modem and an authentication process performed by the mobile communication network through the card reading device.

In one preferable embodiment, after sending the SIM card activation indication message to the target cloud modem, the method further includes: sending a second enable success message to the user equipment, where the second enable success message is used to instruct the user equipment to start using the communication service provided by the target cloud modem. In particular, after the SIM card accesses the mobile communication network successfully, the cloud modem sends the first enable success message of the SIM card to the cloud server, and the cloud server sends the second enable success message of the SIM card to the user equipment according to the first enable success message of the SIM card. The user equipment communicates through the modem according to the modem identification information contained in the second SIM card enable success message.

In one preferable embodiment, the cloud server sends an indication message for enabling the SIM card to the target cloud modem; the indication message for enabling the SIM card also includes device configuration information which is used to instruct the cloud modem to disconnect a connection between a SIM card bound with the cloud modem and a mobile communication carrier network when detecting that a time duration of disconnection between the cloud modem and the cloud server exceeds a preset time duration threshold (e.g., 10 seconds), and clear the SIM card identification information stored in the cloud modem locally. Optionally, the cloud server may instruct the cloud modem to delete the connection between the SIM card allocated by the cloud server disconnected with the cloud modem and the mobile communication network, and clear the identification information of the SIM card. Therefore, a condition that the cloud server, when the cloud server is disconnected with the cloud server, allocates a new cloud modem for the SIM card, so that two cloud modems are bonded with the same SIM card to generate a competition relationship is avoided.

Figure 3:
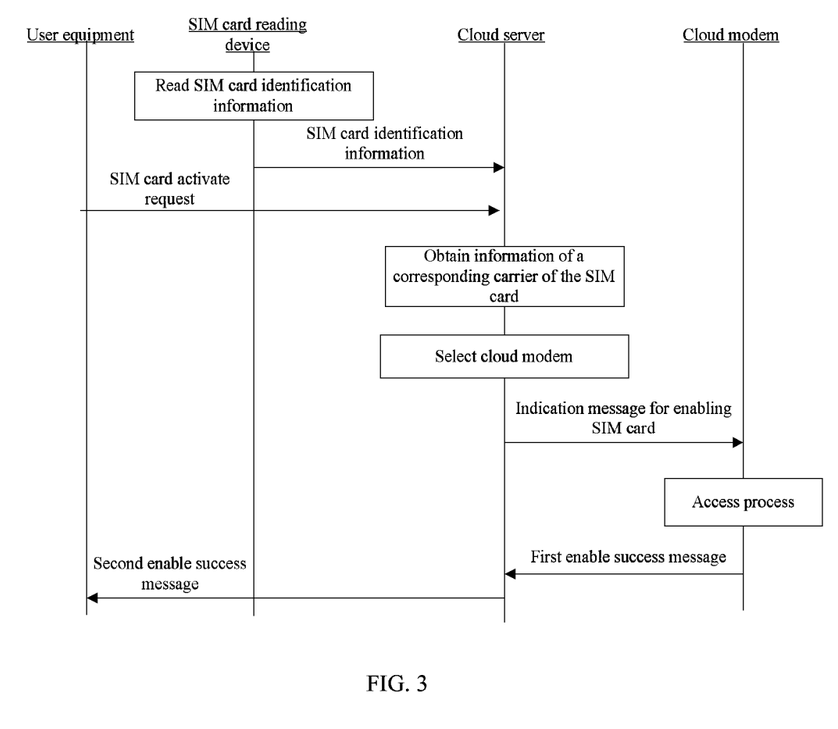
FIG. 3 illustrates a schematic diagram of an information interaction process of the resource allocation method according to one embodiment of the present disclosure.

In one preferable embodiment, FIG. 3 illustrates an information interaction flowchart of the resource allocation method as shown in FIG. 2 in one embodiment shown in FIG. 2. As shown in FIG. 3, a user inserts a user identity recognition card (e.g., SIM card) into a SIM card reading device; the SIM card reading device reads the identification information of the SIM card and then sends the identification information to the cloud server; after receiving a SIM card activate request sent by the user equipment bound with the SIM card reading device, carrier information corresponding to the SIM card is obtained by the cloud server according to the selected SIM card information contained in the SIM card activate request; the cloud server selects a carrier for the SIM card by selecting the MCC (Mobile Country Code) and the MNC (Mobile Network Code) of the SIM card and the pre-stored carrier list or the carrier list queried through a third party service; or the cloud server generates a selectable carrier list corresponding to the SIM card, and sends the selectable carrier list to the user equipment, receives a carrier confirmation message sent by the user equipment, and determine the carrier information according to the carrier confirmation message; the cloud server selects a cloud modem matched with the carrier information from the set of cloud modems and takes this cloud modem as the target cloud modem; the cloud server sends the indication message for enabling the SIM card to the target cloud modem, where the indication message for enabling the SIM card includes SIM card identification information; after receiving the indication message for enabling the SIM card, the cloud modem initiates a process of accessing the mobile communication network selected by the cloud server for the SIM card according to the IMSI (International Mobile Subscriber Identity) information. The access process includes but is not limited to an access request to the mobile communication network initiated by the cloud modem, and an authentication process performed by the mobile communication network through the SIM card reading device; after the SIM card successfully accesses the mobile communication network, the cloud modem sends the first enable success message to the cloud server, and the cloud server sends a second enable success message to the user equipment according to the first enable success message; and the user equipment performs communication through the modem according to the modem identification information contained in the second enable success message. According to the steps mentioned above, an accessible cloud modem in the plurality of cloud modems can be allocated to the SIM card, an automatic matching between the SIM card and the cloud modem is realized, so that an allocation efficiency of cloud modems is improved, and the resource of cloud modems are fully utilized.

In one preferable embodiment, after the cloud server selects a cloud modem that matches the carrier information from the set of cloud modems as the target cloud modem, the resource allocation method further includes: setting status flags of all target cloud modems maintained by the cloud server to be in the allocating state. The status flag includes but is not limited to data stored in a data table of the cloud server, data in a data file, and data represented by a data array in a computer memory, and the like.

Correspondingly, after sending the indication message for enabling the SIM card to the target cloud modem, the method further includes:
determine an enabling result of the SIM card, and determine whether to set the status flag of the target cloud modem as an allocable state by the cloud server according to the enabling result of the SIM card.

In particular, said determine the enabling result of the SIM card and determine whether to set the status flag of the target cloud modem as the allocable state includes:
the target cloud modem flag is set as the allocable state, if the cloud server receives the first enable success message sent by the target cloud modem within the second preset time, and a maximum capacity of the SIM cards is not reached by the target cloud modem. Where the maximum capacity of the SIM cards is the maximum number of SIM cards that can be supported by the cloud modem.

The target cloud modem is moved out of the set of cloud modems, if the cloud server receives the first enable success message sent by the target cloud modem within the second preset time, and the maximum capacity of the SIM card is reached by the target cloud modem.

The target cloud modem is moved out of the set of cloud modems, if the first enable success message or an enable failure message sent by the target cloud modem is not received within the second preset time of the cloud server;
if the cloud server receives the enable failure message sent by the target cloud modem in the second preset time, whether the target cloud modem is moved out of the set of cloud modems or the target cloud modem flag is set as the allocable state is determined according to the reason of failing to enable the SIM card. If the reason of failing to enable the SIM card is not due to the cloud modem, for example, a SIM card is overdue or invalid, the status flag of the target cloud modem is set as the allocable state; if the reason of failing to enable the SIM card is due to malfunction of the cloud modem, for example, a failure message contains a fault code of the cloud modem, and the fault code corresponds to hardware fault, software fault or network fault of the cloud modem, the status flag of the target cloud modem is set as the unallocated state.

It can be understood that, when the cloud modems are allocated in a multi-threads/processes manner in the cloud server, if one thread/process has selected a cloud modem as the target cloud modem, and sends an indication message for enabling the SIM card to the target cloud modem. Before the determination of whether the SIM card is successfully enabled, the resource of cloud modems is uncertain, for example, after the SIM card corresponding to the indication message for enabling the SIM card is enabled, the target cloud modem reaches the maximum capacity of SIM cards and cannot be used for allocation. In this situation, if another thread/process also needs to allocate the target cloud modem, contention may be caused, such that an uncertained allocation result or an allocation failure is caused. By maintaining and setting the status flags of the cloud modems, it can be ensured that a problem of occurrence of contention when a plurality of threads allocate the same cloud modem will be avoided, so that the stability of the system can be improved.

Figure 4:
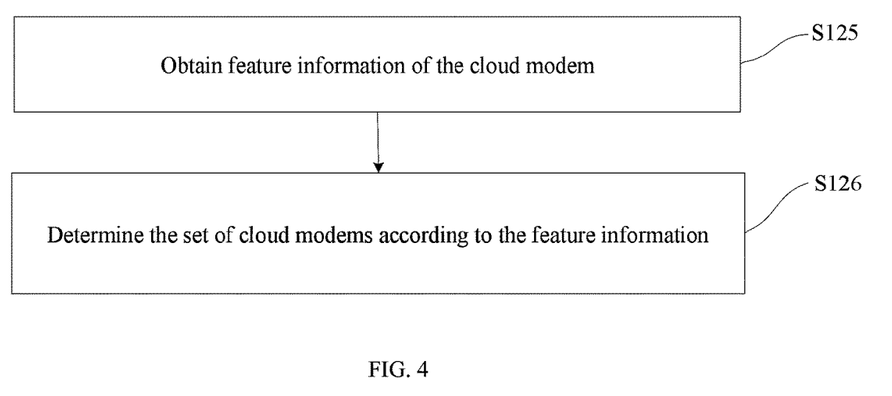
FIG. 4 illustrates a schematic flow diagram of the resource allocation method according to another embodiment of the present disclosure.

Based on the embodiment of the resource allocation method shown in FIG. 2, FIG. 4 illustrates another resource allocation method according to one embodiment of the present disclosure, as shown in FIG. 4, before the step S130 of selecting the cloud modem that matches with the carrier information in the set of cloud modems as the target cloud modem, following step is further included:
at step S125, feature information of the cloud modem is obtained.

There is/are one or a plurality of cloud modems.

Where the feature information is used to characterize device attribute feature information and operating environment feature information of the cloud modem; in particular, the device attribute feature information includes but is not limited to software and hardware attribute features inherent to the device; and the operating environment feature information includes but is not limited to at least one of state features and environmental features during the operation of the device, which include: operating state feature, accessible mobile communication network information, location feature information, service quality feature information, and the like.

It may be understood that, the feature information includes but is not limited to software and hardware attribute feature information of the cloud modem, operating state feature information, network feature information, location feature information, and service quality of feature information.

Where the software and hardware attribute features of the device include but are not limited to identification information, hardware operating environment information, software operating environment information of the cloud modem. The hardware environment information includes but is not limited to a chip model of the modem and a mobile communication network standard that can be supported by the modem; and the software environment information includes but is not limited to at least one of software version information.

Where the operating state feature includes but is not limited to at least one of a normal operating state, an abnormal operating state, and the like.

Where the network feature includes but is not limited to information of a mobile communication network standard supported by the cloud modem and a location of the cloud modem, and the device may detect at least one of the mobile communication network information that can be accessed.

Where the location features include but are not limited to latitude and longitude, and altitude information of the cloud modem, at least one of identification information of location area of the mobile communication network accessible by the cloud modem, such as LAC (Location Area Code), TAC (Tracking Area Code).

In one preferable embodiment, the cloud server obtains the feature information of the cloud modem by receiving a request of accessing the cloud server sent by the modem.

In one preferable embodiment, the cloud server obtains the location feature information of the cloud modem by obtaining the IP address of the cloud modem and querying the location information corresponding to the IP address through an external server, as an alternative, the cloud server obtains the mobile communication network information supported by the cloud modem by receiving the chip model included in the access request sent by the cloud modem and querying the chip model.

At step S126, the set of cloud modems is determined according to the feature information.

In one preferable embodiment, the cloud server determines the normally operated cloud modems as the set of cloud modems according to network types, according to the network feature and the operating state feature of the cloud modem.

In one preferable embodiment, the cloud server determines the set of cloud modems according to the location areas of the cloud modems. For example, the cloud modems located in Shandong Province are determined as a set of cloud modems according to the location information.

In one preferable embodiment, a modem queue is set with the server according to the quality of service features of the cloud modem, and the queue is arranged according to the quality of the signal quality.

It can be understood that the determination manners of determining the set of cloud modems can be intersected and combined with each other. For example, the cloud modems of the set of cloud modems in the Shandong Province are arranged according to the service quality features to generate a queue. For another example, the cloud modems in the set of cloud modems of China Mobile are arranged to generate a queue according to service quality features. A person skilled in the art may select a combination manner of the feature information to determine the set of cloud modems according to the actual condition.

Figure 5:
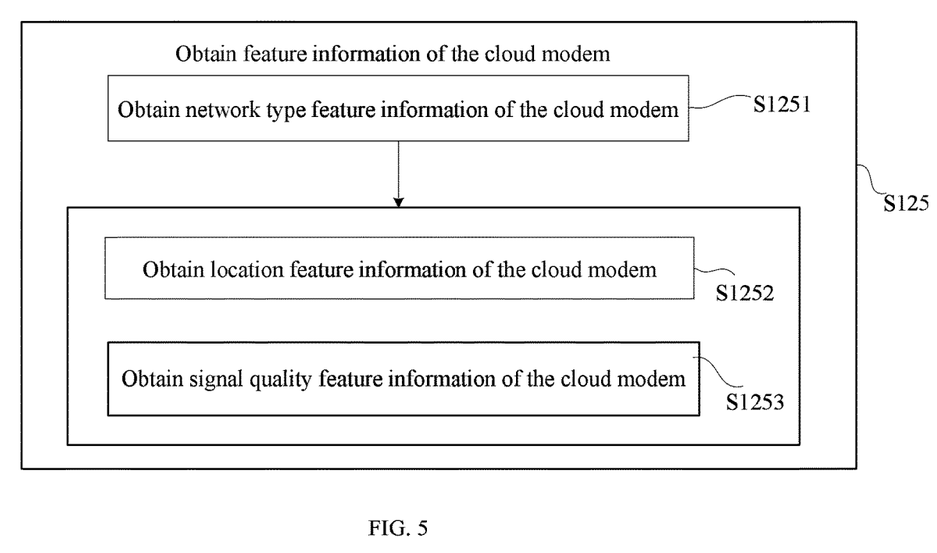
FIG. 5 illustrates a schematic flow diagram of the resource allocation method according to another embodiment of the present disclosure.

Based on the embodiment of the resource allocation method shown in FIG. 3, FIG. 5 illustrates another resource allocation method according to one embodiment of the present disclosure, as shown in FIG. 5, the step S125 of obtaining feature information of the cloud modem includes the following steps:

At step 1251, the network feature information of the cloud modem is obtained.

In one preferable embodiment, the cloud server obtains network standard and frequency band information supported by the hardware of the cloud modem according to an access request sent by the cloud modem, and obtains the mobile communication network information accessible at the location of the cloud modem according to the access request sent by the cloud modem. In one preferable embodiment, the cloud server obtains the network standard and the frequency band information supported by the hardware of the cloud modem using a third-party query service according to the hardware information of the cloud modem carried in the access request sent by the cloud modem; in one preferable embodiment, the cloud server determines the corresponding network standard and frequency band information according to the network standard and the frequency band information carried in the access request sent by the cloud modem. In one preferable embodiment, the cloud modem searches information of accessible mobile communication networks around it according to a AT (Attention) command, and sends the information of the accessible mobile communication networks to the cloud server through the access request, so that the cloud server obtains the information of the accessible mobile communication networks at the location of the cloud modem according to the access request sent by the cloud modem.

Accordingly, one or more subsets of the set of cloud modems are determined according to the network feature information of the cloud modem.

Based on the embodiment of the resource allocation method shown in FIG. 3, FIG. 5 illustrates another resource allocation method according to one embodiment of the present disclosure, as shown in FIG. 5, the step S125 of obtaining the feature information of the cloud modem further includes at least one of the steps S1252-S1253 listed below:

At step S1252, the location feature information of the cloud modem is obtained.

In one preferable embodiment, the location feature information of the cloud modem is obtained by the methods which includes but are not limited to the steps: determining the location information of the cloud modem according to identification information of location area of mobile communication network or global satellite positioning navigation information carried in the access request sent by the cloud modem; and determining the location information of the cloud modem according to the IP address of the cloud modem.

For example, the cloud server determines the location information of the cloud modem according to the identification information of location area of mobile communication network or the global satellite positioning navigation information carried in the access request sent by the cloud modem, where the identification information of the location area of mobile communication network includes but is not limited to LAC and TAC. The satellite positioning navigation information includes but is not limited to: the location information obtained by the cloud modem according to the GPS (Global Positioning System), the Beidou satellite navigation system, GLONASS satellite navigation system and Galileo satellite navigation system.

In one preferable embodiment, the cloud modem obtains the location information through a built-in GPS module, and sends the location information to the cloud server through the access request sent by the cloud modem to the cloud server.

In one preferable embodiment, the cloud modem searches the mobile communication network locally and obtains the LAC or TAC of the cell of the mobile communication network. The cloud modem obtains location information by querying the location corresponding to the LAC or the TAC in a third-party server, and sends the access request to the cloud server, or sends the LAC or TAC to the cloud server, and the cloud server obtains the location information corresponding to the LAC or TAC by querying the third-party server.

At step S1253, service quality feature information of the cloud modem is obtained.

In one preferable embodiment, the cloud server obtains service quality feature information by the methods including but not limited to at least one of: obtaining network signal strength information of the cloud modem according to the access request of the cloud modem; obtaining the historical call quality information of the cloud modem according to a historical call quality detection record of the cloud modem; and obtaining user feedback information about call quality according to the user feedback record about the historical call quality of the cloud modem.

Exemplarily, the cloud modem obtains the current network information by scanning according to the AT (Attention) command, obtains a PLMN (Public Land Mobile Network) list, extracts a base station identifier LAC and a network identifier MNC, and signal strength. The cloud modem sends the MNC and the signal strength corresponding to the MNC to the cloud server according to the access request sent to the cloud server.

Exemplarily, when providing the communication service to the user equipment, the cloud modem detects a call quality and records the detection result of call quality in the historical call detection record, the cloud modem sends the historical call quality detection record to the cloud server according to the access request sent to the cloud server.

Exemplarily, after providing the communication service to the user equipment, the cloud modem initiates a call quality feedback investigation on the user equipment, the user fills in and feeds back a call quality investigation result (e.g., 5 scores scoring result of the user) to the cloud modem through the user equipment. The cloud modem sends the user feedback record about the historical call quality to the cloud server according to the access request sent to the cloud server.

It can be understood that, by at least one of the aforesaid methods, the service quality feature information of the cloud modem in the set of cloud modems is obtained, and the feature information is sorted to obtain the cloud modem queue in the signal quality intensifying or weakening sequence.

Figure 6:
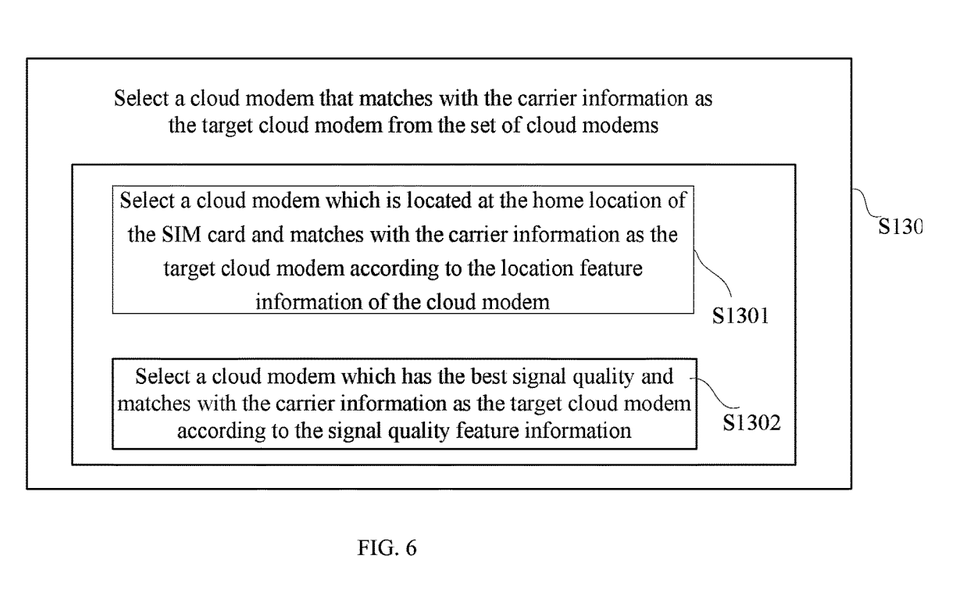
FIG. 6 illustrates a schematic flow diagram of the resource allocation method according to another embodiment of the present disclosure.

Based on the embodiment of the resource allocation method shown in FIG. 5, FIG. 6 illustrates another resource allocation method according to one embodiment of the present disclosure, as shown in FIG. 6, the step S130 of selecting the cloud modem matched with the carrier information in the set of cloud modems as the target cloud modem further includes at least one of the steps S1301 and S1302 listed below:

At step S1301, a cloud modem which is located at the home location of the SIM card and matches with the carrier information is selected as the target cloud modem according to the location feature information of the cloud modem.

In one preferable embodiment, the user requests the cloud server to enable a SIM card, the cloud server determines that this SIM card is the SIM card of China Union according to the IMSI information of the SIM card, and determines that the location of the SIM card is Shenzhen city of Guangdong Province through a third party telephone number home location query service. The cloud server selects a cloud modem which can access the network of China Union and has location feature information of Shenzhen city of Guangdong Province from the set of cloud modems, and allocates this cloud modem to the SIM card.

In one preferable embodiment, the user requests the cloud server to enable a SIM card, the cloud server determines that the SIM card is a SIM card of China Mobile according to the IMSI information of the SIM card, and determines that the location of the SIM card is Kunming city of Yunnan Province through the third-party telephone number home location query service. The cloud server selects a cloud modem which can access to the network of China Mobile and has a location feature information of Kunming city of Yunnan Province from the set of cloud modems and allocates this cloud modem to this SIM card. If there is no cloud modem that corresponds to the Kunming city of Yunnan Province, a cloud modem which can access the network of China Mobile is selected from the set of cloud modems. It can be understood that, the cloud modem can be selected in a narrower geographical range according to the target cloud modem which is located at the home location of the SIM card and can access the carrier that matches with the SIM card, when there is no such cloud modem that matches with the SIM card in the narrower geographical range, geographical range corresponding to the location feature information of the target cloud modem that matches with the SIM card can be gradually broadened. Therefore, the expenditure of the roaming fee of the user can be reduced as much as possible, and user experience is improved.

At step 1302, a cloud modem which has the best signal quality and matches with the carrier information is selected as the target cloud modem according to the service quality feature information.

In one preferable embodiment, the cloud modem in the set of cloud modems is sorted by the cloud server according to signal strength information reported by the cloud modem, and the cloud modem which has the strongest signal strength and can access a carrier that matches with the SIM card as the target cloud modem.

In one preferable embodiment, the cloud modems in the set of cloud modems are sorted according to the historical call quality detection record reported by the cloud modem, the cloud modem which has the optimal historical call detection quality and can access the carrier that matches with the SIM card is selected as the target cloud modem.

In one preferable embodiment, the cloud modems in the set of cloud modems are sorted by the cloud server according to the user feedback record about the historical call quality reported by the cloud modem, and the cloud modem which has the optimal user feedback of historical call quality, and can access the carrier that matches with the SIM card is selected as the target cloud modem.

It may be understood that, a person skilled in the art may sort and screen out the cloud modems in the set of cloud modems according to the service quality feature information under the guidance of the present disclosure, and thereby allocates a cloud modem with the optimal call quality for the user. For example, the cloud modems are sorted according to the signal strengths of the cloud modems, the first N cloud modems with the strongest signal strength is selected, then, the first N cloud modems are sorted according to the historical user feedback records, and the first N cloud modems with the optimal historical user feedback record are selected as the target cloud modems.

It can be understood that, a person skilled in the art can sort and screen out the cloud modems according to the location feature information and the service quality feature information of the cloud modems under the guidance of the present disclosure, thereby allocating a cloud modem which has the lowest roaming fee and the best call quality to the user. For example, if the home location of the obtained SIM card is Xian city of Shanxi Province, M cloud modems located at Xian city of Shanxi Province is first selected from the set of cloud modems; then, the historical call quality detection records of the M cloud modems are sorted, and a cloud modem which has the best historical call quality detection record is selected as the target cloud modem.

It can be understood that, the various non-limiting examples of the method as shown in FIG. 6 can be sorted and combined according to actual requirements, and a person skilled in the art should obtain the technical solutions suitable for practical application under the guidance of the aforesaid examples, and the detail of the technical solutions are not repeatedly described herein.

Figure 7:
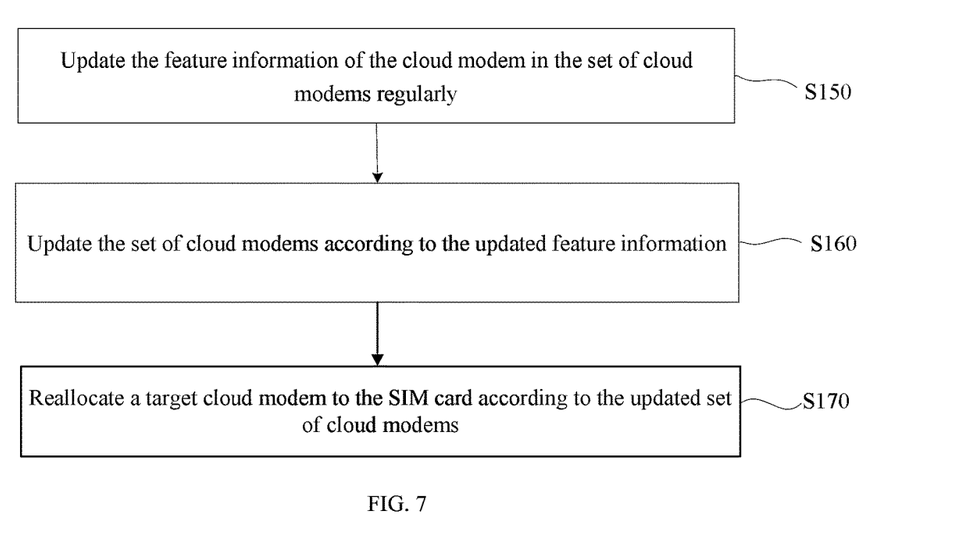
FIG. 7 illustrates a schematic flow diagram of the resource allocation method according to another embodiment of the present disclosure.

Based on the resource allocation method shown in FIG. 4, FIG. 7 illustrates another resource allocation method according to one embodiment of the present disclosure. In the step S126, after determining the set of cloud modems according to the feature information, the resource allocation method further includes:

At step S150, the feature information of the cloud modems in the set of the cloud modems is updated regularly.

In one preferable embodiment, said updating the feature information of the cloud modems in the set of cloud modems regularly includes: updating the feature information by receiving a state update message which is periodically sent by the cloud modem in the set of cloud modems. In a specific example, the cloud modem reports the feature information or the state information to the cloud server regularly; and the cloud server updates the feature information of the cloud modem in the set of cloud modems using the feature information reported by the cloud modem regularly.

At step S160, the valid set of cloud modems is updated according to the updated feature information.

In one preferable embodiment, when the location feature information of the cloud modem is changed, the location feature information of the cloud modem in the set of cloud modems is updated accordingly.

In one preferable embodiment, when the accessible carrier at the location of the cloud modem is changed, for example, a carrier A at the location where the cloud modem is located can be accessed, however, a failure occurs in the network of the carrier A, so that the network of carrier A cannot be accessed currently; at this time, the cloud modem needs to be moved out of the queue that corresponds to the carrier A in the set of cloud modems.

In one preferable embodiment, if a state update message which is periodically sent by the cloud modem is not received within a first preset time, or if the service quality feature updated by the cloud modem is lower than a preset value, the cloud modem is moved out of the set of cloud modems.

At step S170, the target cloud modem is reallocated to the SIM card according to the updated set of cloud modems.

In one preferable embodiment, when the location feature information, the network feature information, or the service quality feature information of the cloud modem is changed, after the set of cloud modems is updated, the cloud modem with changed feature information is reallocated to the SIM card, regarding the detail of the step of reallocating the cloud modem with changed feature information to the SIM card, reference can be made to the resource allocation method provided in the embodiment shown in FIG. 6.

The feature information includes at least one of the information listed below: the operating state information of the cloud modem, the location feature information of the cloud modem, the service quality feature information of the cloud modem, and the network feature information of the cloud modem.

Figure 8:
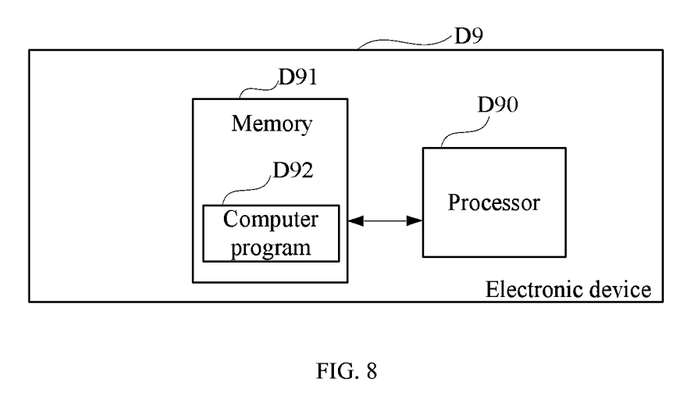
FIG. 8 illustrates a schematic structural diagram of an electronic device according to one embodiment of the present disclosure.

It can be understood that the steps shown in FIG. 8 can be performed at any time after the step S126. According to the steps shown in FIG. 8, the set of cloud modems can be updated in time, and the cloud modem can be reallocated to the SIM card, so that the cloud modems which have the optimal location and the best signal quality can be allocated to the SIM card continuously, and the user experience is improved accordingly.

Based on the resource allocation method shown in FIG. 2, this embodiment of the present disclosure provide another resource allocation method, the step S130 of selecting a cloud modem that matches with the carrier information in the set of cloud modems as the target cloud modem includes:

When receiving a SIM card activate request corresponding to a plurality of SIM cards of the same user sent by the user equipment, one single cloud modem is preferentially selected from the set of cloud modems as the target cloud modem.

In one preferable embodiment, when the user has more than two SIM cards at the same time, and the cloud server is requested to allocate cloud modems to the plurality of SIM cards, the cloud server preferably selects the same cloud modem for the user, and access the multiple SIM cards of the user to the mobile communication network corresponding to the SIM card through the cloud modem, thereby realizing the technical effects of conserving resources and facilitating management.

Embodiment Two

FIG. 8 illustrates an electronic device according to one embodiment of the present disclosure, as shown in FIG. 8, the electronic device D9 in this embodiment includes: at least one processor D90 (only one processor is shown in FIG. 9), a memory D91 and a computer program D92 stored in the memory D91 and executable by the processor D90, when the computer program D92 is executed by the processor D90, the steps in the various method embodiments are implemented. As an alternative, when the computer program D92 is executed by the processor D90, the functions of the various modules/units such as the functions of the modules shown in FIG. 8 in the device embodiment are implemented.

The electronic device D90 can be a computing device such as a desktop computer, a laptop computer, a palm computer, a server, a server cluster, a distributed server, a cloud server, etc. The electronic device D90 can include but is not limited to: a processor D90, the memory D91. The person of ordinary skill in the art can understand that, FIG. 8 only illustrates an example of the electronic device D90, but should not be constituted as limitation to the electronic device D90, more or less components than the components shown in FIG. 9 may be included, or some components or different components may be combined; for example, the electronic device D90 can also include an input and output device, a network access device, etc.

The so called processor D90 can be CPU (Central Processing Unit), and can also be other general purpose processor, DSP (Digital Signal Processor), ASIC (Application Specific Integrated Circuit), FGPA (Field-Programmable Gate Array), or some other programmable logic devices, discrete gate or transistor logic device, discrete hardware component, etc. The general purpose processor may be a microprocessor, as an alternative, the processor can also be any conventional processor, and the like.

In some embodiments, the memory D91 may be an internal storage unit of the electronic device D9, such as a hard disk or a memory of the electronic device D9. In some embodiments, the memory D91 may also be an external storage device of the electronic device D9, such as a plug-in hard disk, a SMC (Smart Media Card), a SD (Secure Digital) card, a FC (Flash Card) equipped on the electronic device D9. Furthermore, the memory D91 can not only include the internal storage unit of the electronic device D9 but also include the external memory of the electronic device D9. The memory D91 is configured to store the computer program, application procedure, BootLoader, data and other procedures, such as the procedure code of the computer program. The memory D91 can also be used to store data that has been output or being ready to be output temporarily.

It should be understood that, the values of serial numbers of the steps in the aforesaid embodiments do not mean a sequencing of execution sequences of the steps, the execution sequences of the steps should be determined by functionalities and internal logic of the steps, and shouldn't be regarded as limitation to an implementation process of the embodiment of the present disclosure.

One embodiment of the present disclosure further provides a computer readable storage medium which stores a computer program, that, when executed by a processor, causes the processor to implement the steps in the various method embodiments.

One embodiment of the present disclosure further provides a computer program product, when the computer program product is executed by the electronic device, the electronic device is caused to implement the steps in the various method embodiments.

The embodiments described above are only intended to explain but not to limit the technical solutions of the present disclosure. Although the present disclosure has been explained in detail with reference to these embodiments, a person of ordinary skilled in the art that may be aware of the fact that, the technical solutions disclosed in the embodiments can also be amended, some technical features in the technical solutions can also be equivalently replaced; the amendments or the equivalent replacements don't cause the essence of the corresponding technical solutions to be deviated from the spirit and the scope of the technical solutions in the embodiments of the present disclosure, and thus should all be included in the protection scope of the present disclosure.

What is claimed is:

1. A resource allocation method, comprising:
   receiving a SIM card activate request by a cloud server, wherein the SIM card activate request comprises identification information of a SIM card;
   obtaining information of a corresponding carrier of the SIM card according to the identification information by the cloud server; and
   selecting, from a set of cloud modems, a cloud modem that matches with the information of the corresponding carrier as a target cloud modem by the cloud server; and
   sending an indication message for enabling the SIM card to the target cloud modem by the cloud server, wherein the indication message for enabling the SIM card includes the identification information; and wherein the indication message for enabling the SIM card is used to instruct the target cloud modem to access a mobile communication network of the corresponding carrier of the SIM card according to the identification information;
   wherein said obtaining information of the corresponding carrier of the SIM card according to the identification information by the cloud server comprises:
   generating a carrier list according to an identification information by the cloud server;
   sending the carrier list to user equipment by the cloud server;
   receiving a carrier confirmation message sent by the user equipment; and
   determining the information of the corresponding carrier according to the carrier confirmation message by the cloud server.

2. The method according to claim 1, wherein after said sending the indication message for enabling the SIM card to the target cloud modem by the cloud server, the method further comprises:
   sending a second enable success message to the user equipment, wherein the second enable success message is used to instruct the user equipment to start using a communication service provided by the target cloud modem, and wherein the second enable success message comprises the identification information of the target cloud modem.

3. The method according to claim 1, wherein before said receiving the SIM card activate request by the cloud server, the method further comprises:
   receiving the identification information of the SIM card sent by a SIM card reading device;
   receiving SIM card query information sent by the user equipment;
   sending available SIM card list information to the user equipment according to the SIM card query information, wherein the SIM card list information is used for instructing the user equipment to determine identification information of one SIM card, and feeding back a SIM card activate request containing the identification information.

4. The method according to claim 1, wherein before said selecting the cloud modem that matches with the information of the corresponding carrier from the set of cloud modems as the target cloud modem by the cloud server, the method further comprises:
obtaining feature information of at least one cloud modem in the set of cloud modems; wherein the feature information is used to characterize device attribute feature information and/or operating environment feature information of the cloud modem;
determining the set of cloud modems according to the feature information of the cloud modem.

5. The method according to claim 4, wherein said obtaining the feature information of the cloud modem by the cloud server comprises:
obtaining network feature information of the cloud modem; and
determining one or a plurality of subsets of the set of cloud modems according to the network feature information of the cloud modem.

6. The method according to claim 5, wherein said obtaining the network feature information of the cloud modem by the cloud server comprises at least one of the following steps:
obtaining a network standard and frequency band information supported by hardware of the cloud modem according to an access request sent by the cloud modem;
obtaining accessible mobile communication network information at a location of the cloud modem according to the access request sent by the cloud modem.

7. The method according to claim 6, wherein said obtaining the feature information of the cloud modem by the cloud server further comprises at least one of the following steps:
obtaining location feature information of the cloud modem;
obtaining feature information of a service quality of the cloud modem.

8. The method according to claim 7, wherein said obtaining the location feature information of the cloud modem by the cloud server comprises at least one of the following steps:
determining the location information of the cloud modem by the cloud server according to identification information of location area of mobile communication network carried in the access request sent by the cloud modem or satellite location and navigation information;
determining the location information of the cloud modem by the cloud server according to an IP address of the cloud modem.

9. The method according to claim 7, wherein said obtaining the feature information of the service quality of the cloud modem by the cloud server comprises at least one of the following steps:
obtaining network signal strength information of the cloud modem according to the access request of the cloud modem;
obtaining historical communication quality information of the cloud modem according to a historical communication quality detection record of the cloud modem;
obtaining user feedback information about communication quality according to a user feedback record about historical communication quality of the cloud modem.

10. The method according to claim 7, wherein said selecting, from the set of cloud modems, the cloud modem that matches with the information of the carrier as the target cloud modem by the cloud server comprises at least one of methods including:
selecting, according to the location feature information of the cloud modem, a cloud modem which is located at a home location of the SIM card and matches with the information of the carrier as a target cloud modem; and
selecting, according to the feature information of the service quality of the cloud modem, a cloud modem which has a best signal quality and matches with the information of the carrier as the target cloud modem.

11. The method according to claim 4, wherein after said determining the set of cloud modems according to the feature information by the cloud server, the method further comprises:
regularly updating the feature information of the cloud modem in the set of cloud modems by the cloud server;
updating the set of cloud modems according to the updated feature information by the cloud server; and
allocating the target cloud modem to the SIM card according to the updated set of cloud modems by the cloud server;
wherein the feature information includes at least one from a group consisting of operating state information of the cloud modem, a location feature information of the cloud modem, the feature information of a service quality of the cloud modem, and network feature information of the cloud modem.

12. The method according to claim 11, wherein said regularly updating the feature information of the cloud modem in the set of cloud modems by the cloud server comprises:
updating the feature information by receiving a state update message which is periodically sent by the cloud modem in the set of cloud modems.

13. The method according to claim 12, further comprising:
moving the cloud modem out of the set of cloud modems by the cloud server if the state update message which is periodically sent by the cloud modem is not received within a first preset time, or if an updated feature value of the service quality of the cloud modem is lower than a preset value.

14. The method according to claim 1, wherein the indication message for enabling the SIM card further comprises device configuration information;
wherein the device configuration information is used to instruct the cloud modem to disconnect a connection between a SIM card bonded with the cloud modem and the mobile communication network, and clear the identification information locally stored in the cloud modem, when detecting that a time duration of disconnection between the cloud modem and a cloud server exceeds a preset time duration threshold.

15. The method according to claim 1, wherein after said selecting, from the set of cloud modems, the cloud modem that matches with the information of the corresponding carrier as the target cloud modem by the cloud server, the method further comprises:
setting a status flag of the target cloud modem to be an allocated state;
accordingly,
after sending the indication message for enabling the SIM card to the target cloud modem, the method further comprises:
determining an enabling result of the SIM card and determining whether to set the status flag of the target cloud modem as the allocable state according to the enabling result of the SIM card by the cloud server.

16. The method according to claim 15, wherein said determining the enabling result of the SIM card and determining whether to set the status flag of the target cloud modem as an allocable state according to the enabling result of the SIM card by the cloud server comprises:
- setting the status flag of the target cloud modem as the allocable state, if a first enable success message sent by the target cloud modem is received within a second preset time and the target cloud modem does not reach a maximum capacity of the SIM card; or
- moving the target cloud modem out of the set of cloud modems, if the first enable success message sent by the target cloud modem is received within the second preset time and the target cloud modem has reached the maximum capacity of the SIM card;
- determining whether to move the target cloud modem out of the set of cloud modems or set the status flag of the target cloud modem to be the allocable state according to a reason of failing to enable the SIM card, if an enable failure message sent by the target cloud modem is received within the second preset time;
- moving the target cloud modem out of the set of cloud modems, if the first enable success message or the enable failure message sent by the target cloud modem is not received within the second preset time.

17. The method according to claim 1, wherein said selecting, from the set of cloud modems, the cloud modem that matches with the information of the corresponding carrier as the target cloud modem by the cloud server comprises:
- preferentially selecting the same cloud modem in the set of cloud modems as the target cloud modem, when SIM card activate requests corresponding to multiple SIM cards of the same user are received from the user equipment.

18. An electronic device, comprising a memory, a processor, and a computer program stored in the memory and executable by the processor, wherein when the computer program is executed by the processor, the processor is configured to perform a resource allocation method comprising:
- receiving a SIM card activate request by a cloud server, wherein the SIM card activate request comprises identification information of a SIM card;
- obtaining information of a corresponding carrier of the SIM card according to the identification information by the cloud server; and
- selecting, from a set of cloud modems, a cloud modem that matches with the information of the corresponding carrier as a target cloud modem by the cloud server; and
- sending an indication message for enabling the SIM card to the target cloud modem by the cloud server, wherein the indication message for enabling the SIM card includes the identification information; and wherein the indication message for enabling the SIM card is used to instruct the target cloud modem to access a mobile communication network of the corresponding carrier of the SIM card according to the identification information;
- wherein said obtaining information of the corresponding carrier of the SIM card according to the identification information by the cloud server comprises:
- generating a carrier list according to an identification information by the cloud server;
- sending the carrier list to user equipment by the cloud server;
- receiving a carrier confirmation message sent by the user equipment; and
- determining the information of the corresponding carrier according to the carrier confirmation message by the cloud server.

19. A non-transitory computer readable storage medium which stores a computer program, that, when executed by a processor, causes the processor to perform a resource allocation method comprising:
- receiving a SIM card activate request by a cloud server, wherein the SIM card activate request comprises identification information of a SIM card;
- obtaining information of a corresponding carrier of the SIM card according to the identification information by the cloud server; and
- selecting, from a set of cloud modems, a cloud modem that matches with the information of the corresponding carrier as a target cloud modem by the cloud server; and
- sending an indication message for enabling the SIM card to the target cloud modem by the cloud server, wherein the indication message for enabling the SIM card includes the identification information; and wherein the indication message for enabling the SIM card is used to instruct the target cloud modem to access a mobile communication network of the corresponding carrier of the SIM card according to the identification information;
- wherein said obtaining information of the corresponding carrier of the SIM card according to the identification information by the cloud server comprises:
- generating a carrier list according to an identification information by the cloud server;
- sending the carrier list to user equipment by the cloud server;
- receiving a carrier confirmation message sent by the user equipment; and
- determining the information of the corresponding carrier according to the carrier confirmation message by the cloud server.

* * * * *